United States Patent
Sone et al.

(10) Patent No.: US 8,427,739 B2
(45) Date of Patent: Apr. 23, 2013

(54) OPTICAL AMPLIFIER

(75) Inventors: Kyosuke Sone, Kawasaki (JP); Susumu Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 13/088,904

(22) Filed: Apr. 18, 2011

(65) Prior Publication Data

US 2011/0286085 A1 Nov. 24, 2011

(30) Foreign Application Priority Data

May 19, 2010 (JP) ................................. 2010-114989

(51) Int. Cl.
*H01S 3/00* (2006.01)

(52) U.S. Cl.
USPC ............. 359/341.41; 359/341.42; 359/341.43

(58) Field of Classification Search ............. 359/341.41, 359/341.42, 341.43
See application file for complete search history.

(56) References Cited

U.S. PATENT DOCUMENTS

| | | | | |
|---|---|---|---|---|
| 2002/0114066 | A1* | 8/2002 | Nakaji ...................... | 359/341.41 |
| 2004/0240044 | A1* | 12/2004 | Park et al. ................ | 359/341.41 |
| 2008/0137179 | A1* | 6/2008 | Li et al. .................... | 359/337.13 |
| 2009/0316255 | A1* | 12/2009 | Ramakrishnan et al. ..... | 359/337 |
| 2010/0221012 | A1 | 9/2010 | Awaji | |

FOREIGN PATENT DOCUMENTS

| | | |
|---|---|---|
| JP | 2006-238368 A | 9/2006 |
| JP | 2008-148286 A | 6/2008 |
| JP | 2008-300818 A | 12/2008 |

OTHER PUBLICATIONS

Nakaji, Haruo et al., "Superior high-speed automatic gain controlled erbium-doped fiber amplifiers," Optical Fiber Technology, vol. 9, Issue 1, Jan. 1, 2003, pp. 25-35.
Tian, Cechan et al., "Analysis and Control of Transient Dynamics of EDFA Pumped by 1480- and 980-nm Lasers," Journal of Lightwave Technology, vol. 21, No. 8, Aug. 1, 2003, pp. 1728-1734.
Zhao, Chun-Liu et al., "Optical automatic gain control of EDFA using two oscillating lasers in a single feedback loop," Optics Communications, vol. 225, Issues 1-3, Sep. 15, 2003, pp. 157-162.

* cited by examiner

*Primary Examiner* — Mark Hellner
(74) *Attorney, Agent, or Firm* — Fujitsu Patent Center

(57) ABSTRACT

An optical amplifier includes an input port, an output port, an amplification medium, a light source, a monitor, and a controller. The amplification medium with which doped an rare-earth element for optical amplification is allocated on an optical path between the input port and the output port. The light source supplies the amplification medium with an excitation light. The monitor monitors a total power of an optical signal of each wavelength according to a monitor period which is longer than a transient response time of the amplification medium. The controller controls the light source so that a power of the excitation light is constant when a monitor value of the monitor is equal to or smaller than a predetermined threshold value and controls the light source so that an optical gain in the amplification medium is constant when the monitor value is larger than the predetermined threshold value.

11 Claims, 10 Drawing Sheets

INPUT LIGHT

OUTPUT LIGHT

OPTICAL AMPLIFIER

CROSS-REFERENCE TO RELATED APPLICATIONS

This application is based upon and claims the benefit of priority of the prior Japanese Patent Application No. 2010-114989, filed on May 19, 2010, the entire contents of which are incorporated herein by reference.

FIELD

Embodiments discussed herein relate to an optical amplifier into which a plurality of optical signals with various wavelengths is intermittently input.

BACKGROUND

Packet processing by all-optical signal is expected as a packet routing technique for a future photonic network. However, because of various problems, there is no prospect of practical use of the packet routing technique. For example, from the viewpoint of an optical amplifying relay device, there is the following technical problem.

In an optical burst communication or an optical packet communication, optical signals are transmitted in a state where the optical signals are not scrambled statistically, that is, in a burst state, resulting in a period with no optical signal. If the intermittent optical signals are input into the optical amplifier used in an optical relay device, a temporal change (an optical surge) may be generated in a rising part of an output light as illustrated in FIG. 1 due to a transient response of a gain in the optical amplifier. As a result, after being amplified, the optical signals may have wavelength deterioration. The problem is addressed by realizing an optical amplifier that amplifies the intermittent optical signals transmitted in the burst state while reducing the wavelength deterioration.

An optical method of using an optical loop circuit or the like (for example, see Non-Patent Document 1) and an electrical method of using an Automatic Gain Control (AGC) circuit or the like are reported as a conventional technique that addresses the above-described problem. However, there is a problem that the configuration of the optical method is complex and has low controllability. On the other hand, the electrical method is effective when the period with the optical signal and the period without the optical signal are switched with respect to each other at a relatively slow speed. However, if data such as an optical packet of which granularity is small is handled, the control speed of the electrical method is insufficient, and no response is made.

Apart from the above-described optical method and electrical method, there is a technique for controlling the transient response by using a rare earth-doped fiber of which an active region is expanded (for example, see Patent Document 1). Specifically, as illustrated in FIG. 2, by using the rare earth-doped fiber of which the active region is expanded, the non-saturation region according to the amplification property, which indicates a relation between an input power and the optical gain, is expanded. Due to this, the transient response becomes controllable because the optical gain is hardly changed even if the input power suddenly changes in a rising edge of the optical signal that is intermittently input.

[Patent Document 1] Japanese Laid-open Patent Publication No. 2008-300818.

[Non-Patent Document 1] Chun-Liu Zhao, Hwa-Yaw Tam, Bai-Ou Guan, Xinyong Dong, P. K. A. Wai, Xiaoyi Dong, "Optical automatic gain control of EDFA using two oscillating lasers in a single feedback loop", Optics Communications, Volume 225, Issues 1-3, 15 Sep. 2003, pp. 157-162.

[Non-Patent Document 2] Cechan Tian, Susumu Kinoshita, "Analysis and Control of Transient Dynamics of EDFA Pumped by 1480- and 980-nm Lasers", Journal of Lightwave Technology, Vol. 21, No. 8, August 2003, pp. 1728-1734.

[Non-Patent Document 3] Haruo Nakaji, Yoshiharu Nakai, Masayuki Shigematsu, Masayuki Nishimura, "Superior high-speed automatic gain controlled erbium-doped fiber amplifiers", Optical Fiber Technology, Volume 9, Issue 1, January 2003, pp. 25-35.

However, regarding the optical amplifier that suppresses the transient response by applying the above-described conventional technique, there is a problem that a deflection between wavelengths is generated in the output light power if a Wavelength Division Multiplexing (WDM) light is handled. That is, when a plurality of optical signals with various wavelengths is collectively amplified by the optical amplifier, for example, the gain on the shorter wavelength side illustrated in FIG. 3A relatively decreases, and a wavelength tilt is generated in the optical signal power of each wavelength output from the optical amplifier if the total power of the optical signal of each wavelength becomes large and optical amplification operation is performed across the saturation region.

In the above-described Patent Document 1, the optical signal power of each wavelength after being amplified is equalized by using a gain equalizing filter. However, if setting of a desired gain in the optical amplifier is changed due to change of an operation state of the WDM light, a wavelength property of the gain changes. Therefore, the wavelength tilt is unlikely to be controlled sufficiently by the gain equalization filter of which a transparent property is fixed. If the transparent property of the gain equalization filter is actively controlled, the output optical power may be equalized. However, the gain equalization filter of which the transparent property is variable is expensive, and the control of the transparent property is complex. This may disturb the practical use of the gain equalization filter.

For the control of the optical amplifier corresponding to the related WDM light, as illustrated in FIG. 3B, there is a known technique for controlling generation of the wavelength tilt by applying the AGC to equalize the gain regardless of the change of the input power. As illustrated in FIG. 4, in the optical amplifier that applies the AGC, the optical amplification operation is stopped when a monitor value of the total power of the input light is equal to or smaller than an input break detection threshold value that is set in advance. This is because the accuracy of a monitor decreases because noise generated in a circuit part monitoring the input light is dominant, and a control error of the AGC is generated, and stability to temperature variation becomes inefficient. If the AGC used in this way is applied to the amplification of optical signals with various wavelengths that are intermittently input, the signal densities of the input lights are temporally different from each other. Thus, in a period in which the signal density is low, the value obtained by monitoring the total power of the input light in a prescribed period decreases even though the signal level is normal. Accordingly, if the monitor value is equal to or smaller than the input break detection threshold value, the optical amplification operation is stopped even though the intermittent optical signals are normally input.

SUMMARY

According to an aspect of the invention, an optical amplifier includes an input port, an output port, an amplification medium, a light source, a monitor, and a controller. The input port is input to a plurality of optical signals with various wavelengths. The output port is output from a plurality of optical signals with various wavelengths. The amplification medium is allocated on an optical path between the input port and the output port. An rare-earth element for optical amplification is doped with the amplification medium. The light source supplies the amplification medium with an excitation light. The monitor monitors a total power of an optical signal of each wavelength to input into the amplification medium according to a monitor period which is longer than a transient response time of the amplification medium. The controller controls the light source so that a power of the excitation light is constant when a monitor value of the monitor is equal to or smaller than a predetermined threshold value and controls the light source so that an optical gain in the amplification medium is constant when the monitor value is larger than the predetermined threshold value.

Advantages of the invention will be realized and attained via the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 5:
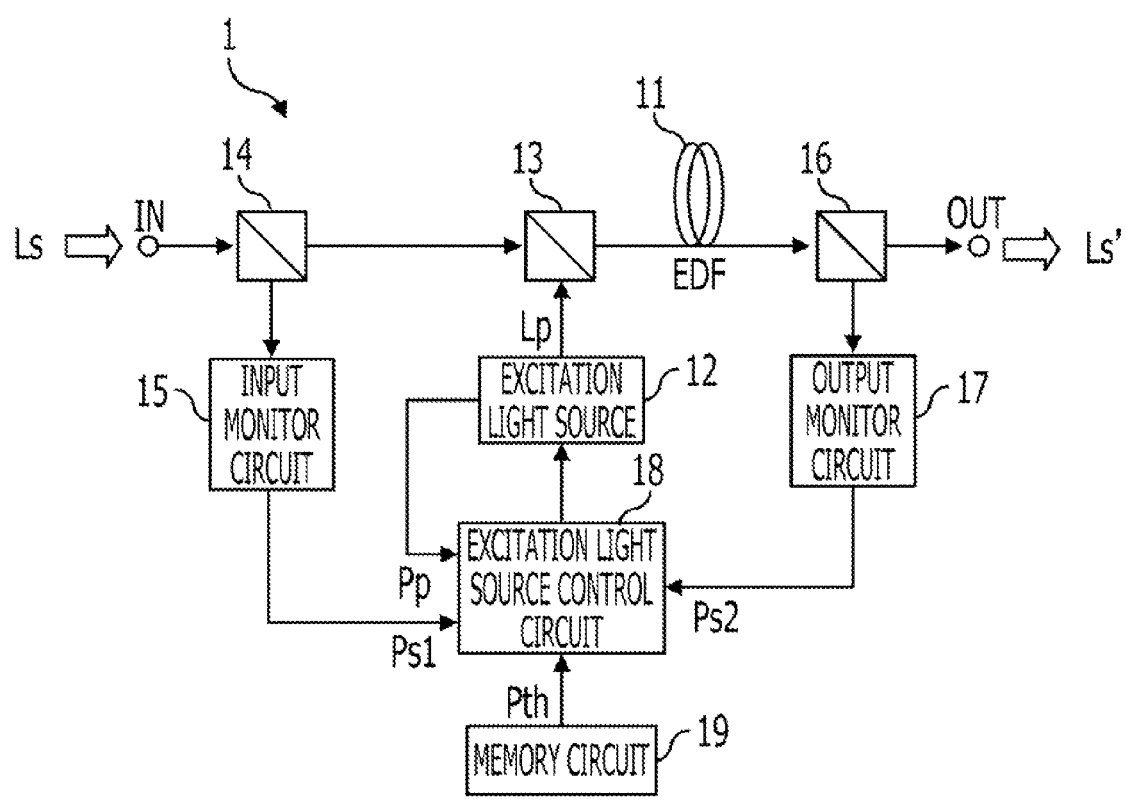
FIG. 5 is a block diagram illustrating a configuration of an embodiment of an optical amplifier according to the present invention.

With reference to the attached diagrams, embodiments of the present invention will be described in detail. FIG. 5 is a block diagram illustrating a configuration of an embodiment of an optical amplifier according to the present invention. In FIG. 5, an optical amplifier 1 according to the present embodiment includes, for example, an Erbium Doped Fiber (EDF) 11 as an amplifier medium allocated on an optical path between an input port IN and an output port OUT, an excitation light source 12 and a multiplexer 13 as an excitation unit that supplies an excitation light Lp to the EDF 11, a branch unit 14 and an input monitor circuit 15 as an input monitor that monitors the power of an input light Lp, an branch unit 16 and an output monitor circuit 17 that monitors the power of an output light Lp', and an excitation light source control circuit 18 and a memory circuit 19 as a controller that controls the excitation light source 12.

A plurality of optical signals with various wavelengths is intermittently input into the input port IN. Specifically, the input light Ls may be an optical burst signal of each wavelength in an optical burst communication corresponding to the WDM method or may be an optical packet signal of each wavelength in an optical packet communication corresponding to the WDM method.

The EDF 11 is an amplification medium that is formed by doping a prescribed region having a core of an optical fiber with Erbium (Er). Like the rare earth-doped fiber described in Patent Document 1, the EDF 11 applies the configuration in which the diameter of the active region is expanded to enable the control of the transient response by expanding the non-saturation region. Specifically, an EDF, of which a diameter of the active region is equal to or larger than 3.4 µm or smaller than 10 µm, or an EDF, of which a numerical aperture is equal to or smaller than 0.2, may be used. Here, the example illustrates that Erbium is doped as an active substance to the optical fiber to increase the input light Ls. However, the active substance is not limited to Erbium. Rare earth elements other than Erbium may be doped to the optical fiber according to a wavelength band of the input light Ls or the like. The form of the amplification medium is not limited to the optical fiber. An optical waveguide is applicable.

The excitation light source 12 generates the excitation light Lp that has a wavelength by which the erbium in the EDF 11 goes to the excitation state, so that the excitation light source 12 outputs the excitation light Lp to the multiplexer 13. A driving state of the excitation light source 12 may be controlled by the excitation light source control circuit 18. The excitation light source 12 has a function for monitoring the output power of the excitation light Lp output to the multiplexer 13 by using a rear light emitted in the opposite direction of the excitation light Lp. The monitor value Pp is sent to the excitation light source control circuit 18 from the excitation light source 12. Here, the example illustrates that a monitor function of the excitation light power is built into the excitation light source 12. Part of the excitation light Lp output from the excitation light source 12 to the multiplexer 13 is branched, and the power may be monitored by an external optical detector.

The multiplexer 13 multiplexes the input light Ls transmitted from the input port IN through the branch unit 14 and the excitation light Lp output from the excitation light source 12 and sends the multiplexed light to one end of the EDF 11. The input light Ls and the excitation light Lp sent to the end of the EDF 11 are propagated in the same direction in the EDF 11. The optical signals with the wavelengths included in the input light Ls are collectively amplified by stimulated emission of Erbium that is excited by the excitation light Lp. Here, the example describes a configuration example of a forward excitation type in which the multiplexer 13 is allocated on an optical path between the input port IN and the EDF 11. However, a configuration of a backward excitation type in which the multiplexer 13 is allocated on the optical path between the EDF 11 and the output port OUT or a configuration of a bidirectional excitation type in which the forward excitation type is combined with the backward excitation type is applicable.

The branch unit 14 branches a part of the input light Ls that is sent from the input port IN to the one end of the EDF 11 thorough the multiplexer 13 and outputs the branched light to the input monitor circuit 15. After receiving the branched light from the branch unit 14 by a photo detector (not illustrated) and converting the branched light into an electric signal, the input monitor circuit 15 uses the electric signal and the branch ratio of the branch unit 14 to calculate a time average value Ps1 (hereinafter referred to as an average input power Ps 1) of a total power of the input light Ls that is given to the EDF 11 according to a monitor period that is set in advance. The input monitor circuit 15 sends the result to the excitation light source control circuit 18. The monitor period is set to be longer than a transient response time (a gain moderation time) of the EDF 11. Specifically, since the general transient response time of the EDF is 2 to 10 μs, the above-described monitor period may be set to be 10 μs or higher.

The branch unit 16 branches a part of the output light Ls' that is to be transmitted to the output port OUT from the other end of the EDF 11 and outputs the branched light to the output monitor circuit 17. After receiving and converting the branched light from the branch unit 16 with the photo detector (not illustrated) and into an electric signal, the output monitor circuit 17 uses the branch ratio of the electric signal and the branch unit 16 to calculate a time average value Ps2 (hereinafter referred to as an average output power Ps2) of the total power of the output light Ls' that is transmitted through the EDF 11 and amplified according to the monitor period that is set in advance. Then, the output monitor circuit 17 sends a result to the excitation light source control circuit 18.

The excitation light source control circuit 18 compares a value relation between the average input power Ps1, which is monitored by the input monitor circuit 15, and a control switch threshold value Pth stored in the memory circuit 19. The control switch threshold value Pth is set as a standard to switch the control mode of the excitation light source 12 and stored in the memory circuit 19. A specific setting method of the control switch threshold value Pth will be described below. When the average input power Ps1 is equal to or smaller than the control switch threshold value Pth, the excitation light source control circuit 18 performs Automatic Power Control (APC) of the excitation light source 11 so that the power of the exaction light Lp supplied to the EDF 11 becomes constant. The APC is performed with reference to a monitor value Pp of the excitation light output power monitored by the excitation light source 11. On the other hand, if the average input power Ps 1 is larger than the control switch threshold value Pth, the excitation light source control circuit 18 performs Automatic Gain Control (AGC) of the excitation light source 11 so that the gain of the optical signal in the EDF 11 becomes constant. The AGC is performed with reference to the gain calculated by using the average input power Ps1, which is monitored by the input monitor circuit 15, and the average output power Ps2, which is monitored by the output monitor circuit 17.

Figure 6:
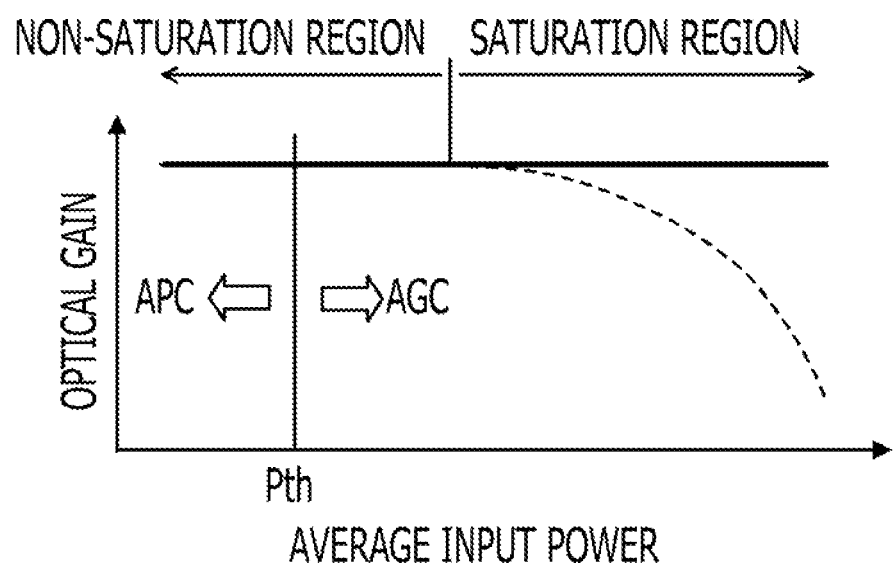
FIG. 6 is a diagram illustrating a first setting example of a control switch threshold value according to the above-described embodiment.

The setting of the control switch threshold value Pth will be described in detail. FIG. 6 is a diagram illustrating a first setting example of the control switch threshold value Pth. The property indicated with a dashed line in FIG. 6 illustrates a relation of the optical gain corresponding to the average input power that is gained when the optical amplifier 1 is driven according to the target value of the optical gain determined according to operation conditions of a system in which the optical amplifier 1 is applied. Regarding the amplification property, a region in which the optical gain is constant even if the average input power increases or decreases is referred to as a "non-saturation region," and the region where the optical gain decreases as the average input power increases is referred to as a "saturation region."

Figure 1:
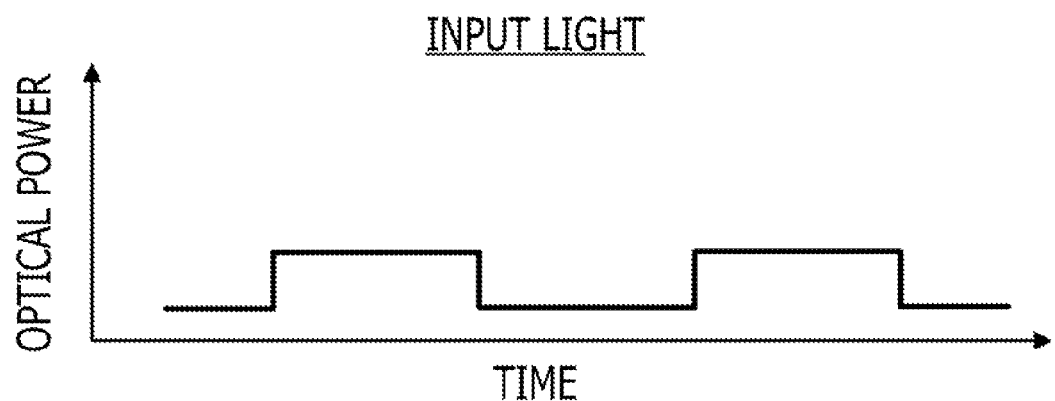
FIG. 1 is a diagram illustrating a transient response of a gain if an intermittent optical signal is input into a regular optical amplifier.
Figure 1:
Figure 1:
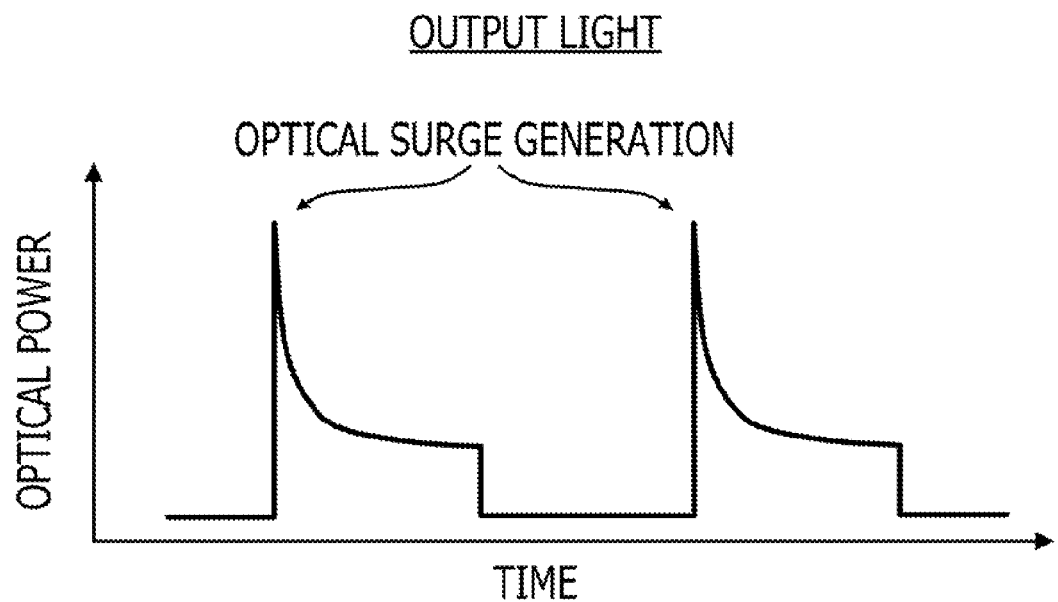
Figure 2:
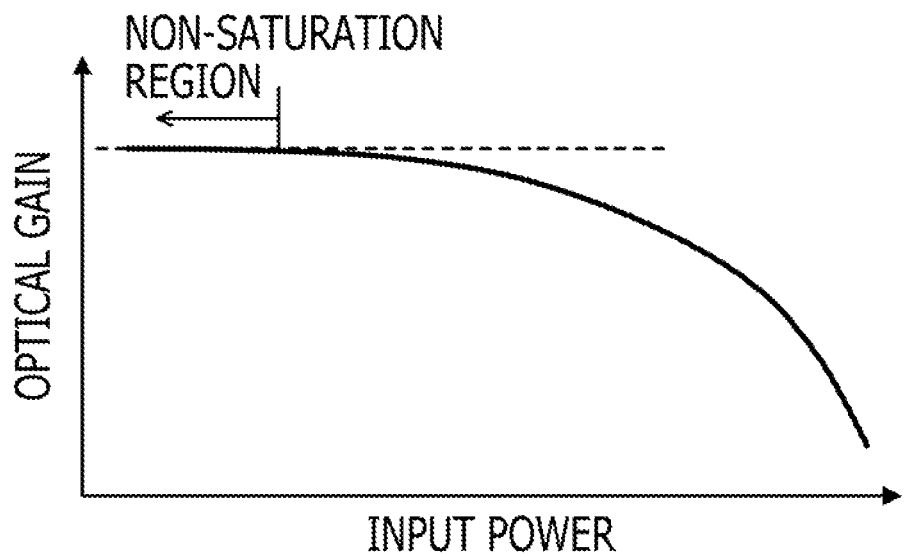
FIG. 2 is a diagram illustrating a property of a related optical amplifier for expanding an active region and controlling a transient response.
Figure 2:
Figure 2:
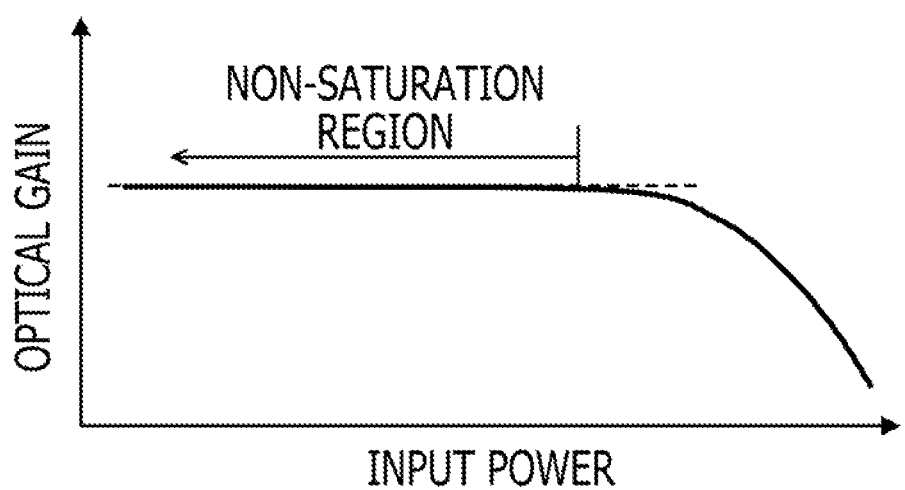
Figure 3A:
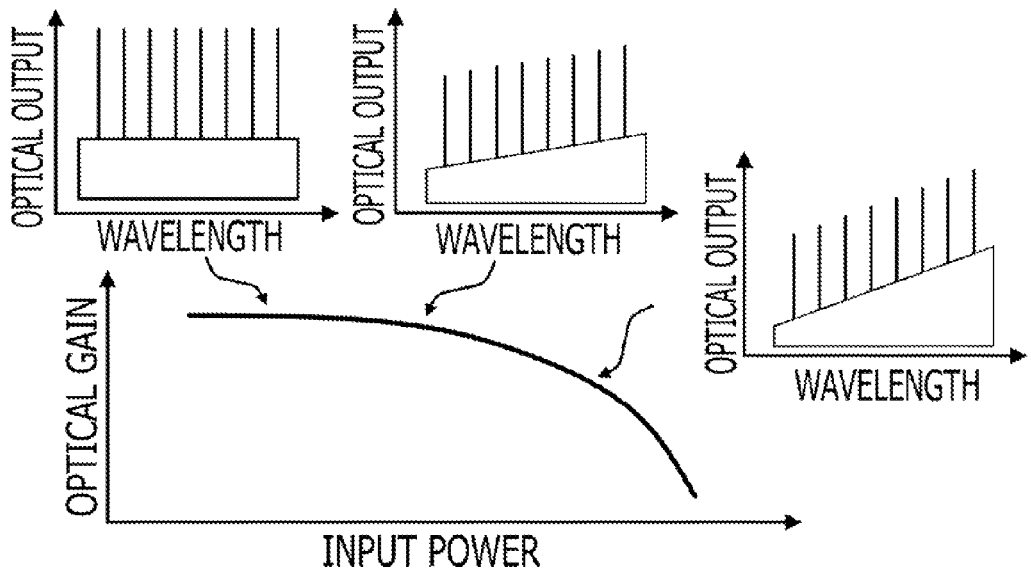
FIGS. 3A and B are diagrams illustrating an example of a related control for suppressing generation of a wavelength tilt by applying AGC.
Figure 3B:
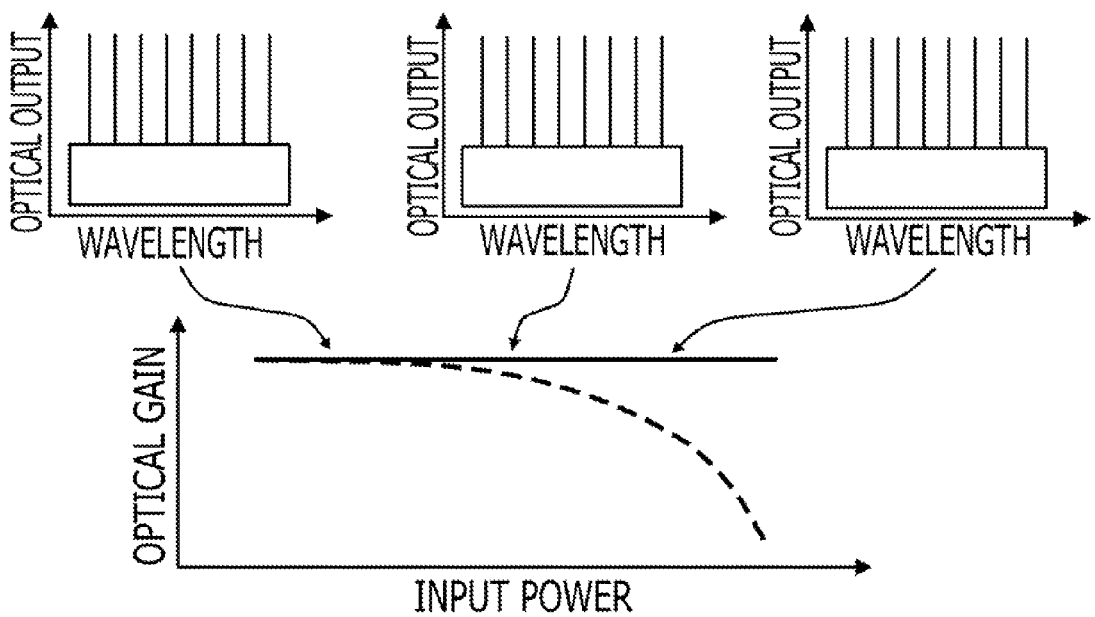
Figure 4:
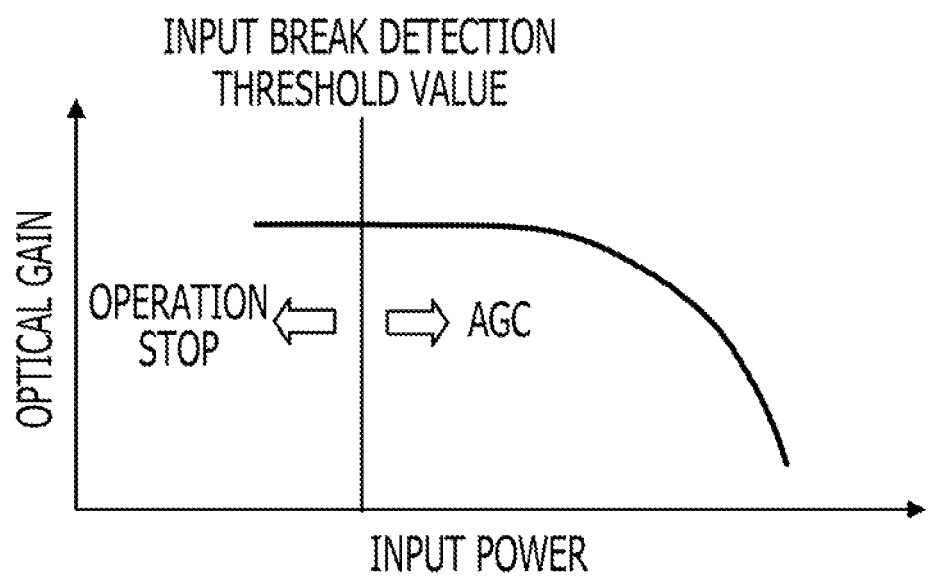
FIG. 4 is a diagram illustrating a problem of a related optical amplifier to which AGC is applied.

With respect to the above-described amplification property, the control switch threshold value Pth according to the first setting example is set within the non-saturation region. In this case, the control switch threshold value Pth is set in a position where the average input power corresponding to the input break detection threshold value in the related optical amplifier illustrated in FIG. 4 is sufficiently small. As described above, the related optical amplifier, which applies the AGC, stops the optical amplifier operation if the input power is equal to or smaller than the input break detection threshold value. In contrast, in the optical amplifier 1 according to the present embodiment, the control mode of the excitation light source 12 may be switched to the APC from the AGC if the average input power is equal to or smaller than the control switch threshold value Pth in the first setting example even though the density of the optical signals with various wavelengths that are intermittently input is low so that the optical signal level of each wavelength is in the normal state (a state where no input break is generated).

Figure 7:
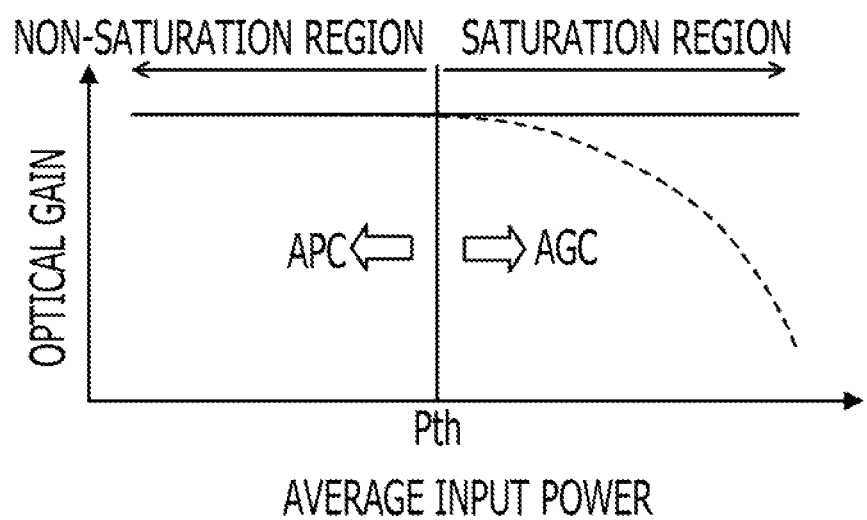
FIG. 7 is a diagram illustrating a second setting example of a control switch threshold value according to the above-described embodiment.

FIG. 7 is a diagram illustrating a second setting example of the control switch threshold value Pth. With respect to the amplification property (the dashed line in FIG. 7) obtained when the optical amplifier 1 is driven according to the target value of the optical gain, the control switch threshold Pth in the second setting example is set in the vicinity of a border between the non-saturation region and the saturation region. At the switching of the control by applying the control switch threshold value Pth in the first setting example illustrated in FIG. 6, if the average input power is larger than the control switch threshold value Pth, the AGC may be performed in the non-saturation region. In the non-saturation region, the optical gain is constant without depending on the input power, so that no wavelength tilt is generated even if the input power changes in the non-saturation region. That is, the wavelength tilt is not desired to be suppressed by the AGC within the non-saturation region, and the APC, which is easy to be controlled, is performed sufficiently. In the second setting example, the control switch threshold value Pth is set in the vicinity of the border between the non-saturation region and the saturation region so that the APC is performed in the almost entire region.

Figure 8:
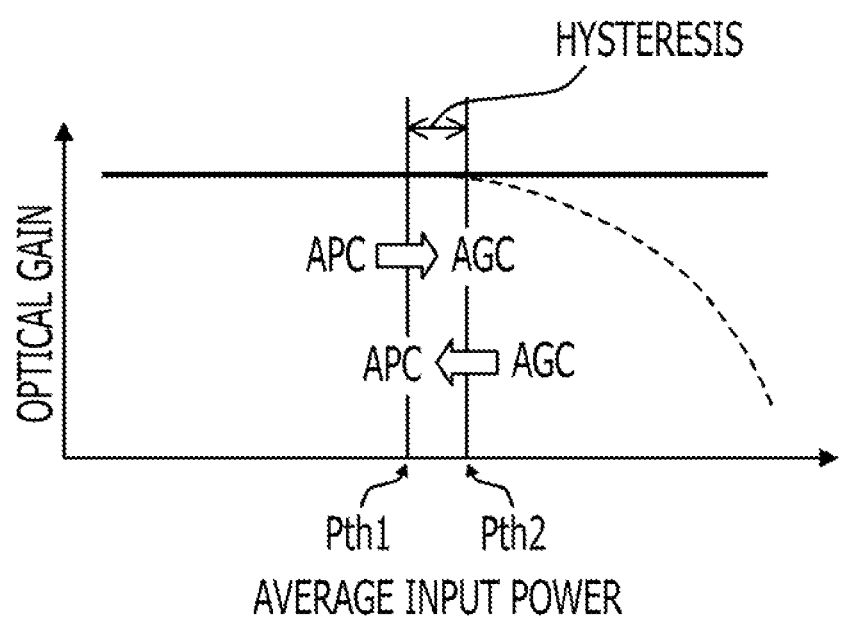
FIG. 8 is a diagram illustrating a third setting example of the control switch threshold value according to the above-described embodiment.

FIG. 8 is a diagram illustrating a third setting example of the control switch threshold value Pth. As described in the second setting example where the control switch threshold value Pth is set in the vicinity of the border between the non-saturation region and the saturation region, if the optical signal in which the average input power changes in the vicinity of the control switch threshold value Pth is input, the switching between the APC and the AGC is performed frequently, so that the control may become unstable. In the third setting example, control switch threshold values Pth1 and Pth2 are set in the vicinity of the border between the non-saturation region and the saturation region. The control switch threshold value Pth1, which is smaller than the control switch threshold value Pth2, is used to switch the control of the excitation light source 12 to the AGC from the APC. The control switch threshold value Pth2, which is larger than the control switch threshold value Pth1, is used to switch the control of the excitation light source 12 to the APC from the AGC. In this manner, by giving hysteresis to the control switch threshold value, the operation of the optical amplifier 1 may become stable.

Figure 9:
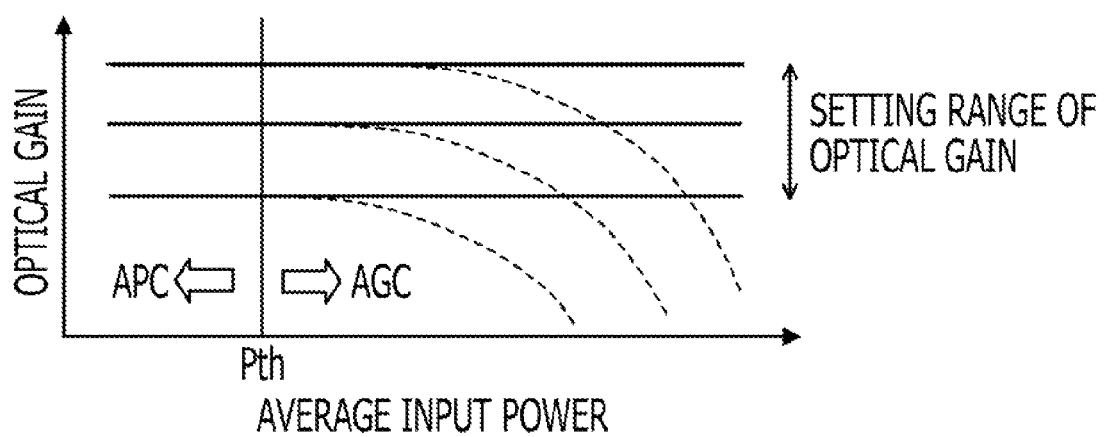
FIG. 9 is a diagram illustrating a fourth setting example of the control switch threshold value according to the above-described embodiment.
Figure 10:
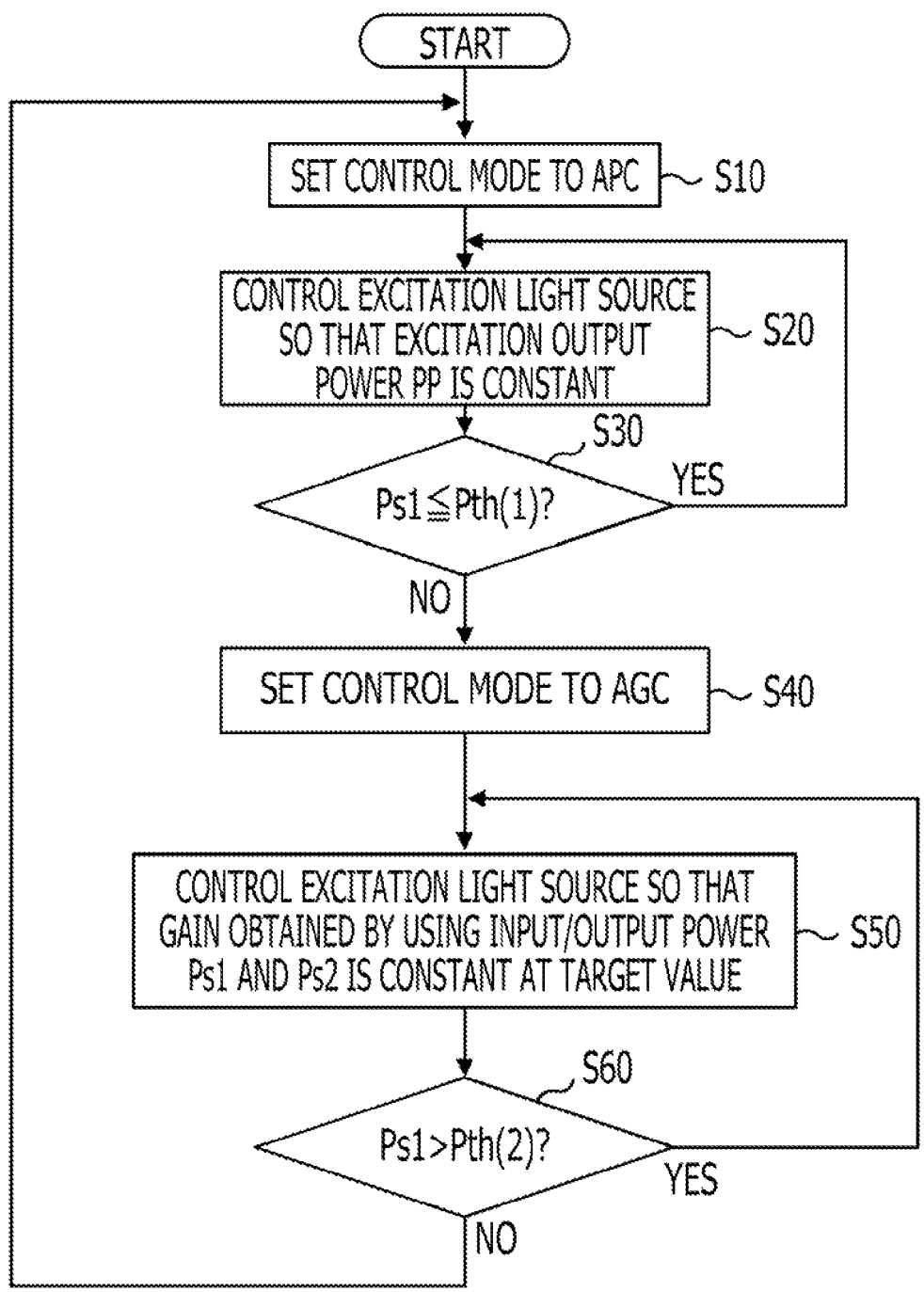
FIG. 10 is a flowchart illustrating a control operation according to the above-described embodiment.

FIG. 9 is a diagram illustrating a fourth setting example of the control switch threshold value Pth. In the above-described second and third setting examples, the control switch threshold value Pth is set based on the amplification property according to one target value of the optical gain. However, the target value of the optical gain may be changed as the operation condition or the like of the system changes. The fourth setting example is assumed to set a range of a target value of the optical gain that may be set to the optical amplifier 1, and the control switch threshold value Pth is set to be effective to an arbitrary target value within the setting range. Specifically, as illustrated in FIG. 9, in consideration of the property in which the non-saturation region is expanded as the target value of the optical gain increases, the control switch threshold value Pth is set in the vicinity of the border between the non-saturation region and the saturation region based on the amplification property according to the lowest target value in the setting range of the optical gain. If the control switch threshold value Pth by the fourth setting example has the hysteresis in the same way as in the third setting example, the operation of the optical amplifier 1 may become stable.

With reference to the flowchart illustrated in FIG. 9, the control operations of the optical amplifier 1 will be described below. In the optical amplifier 1 with the above-described configuration, if the excitation light source control circuit 18 starts controlling the excitation light source 12 by starting the device or the like, the control mode is initialized to the APC in Operation 10 (indicated as S10). In Operation 20, the excitation light source control circuit 18 controls the driving state of the excitation light source 11 so that the monitor value Pp of the excitation output power monitored by the excitation light source 11 becomes constant at a prescribed level.

In Operation 30, the excitation light source control circuit 18 determines whether or not the average input power Ps1 monitored by the input monitor circuit 15 is equal to or smaller than the control switch threshold value Pth stored in the memory circuit 19. If the control switch threshold values Pth1 and Pth2 having the hysteresis are set as in the third setting example illustrated in FIG. 8, the control switch threshold value Pth1, which is smaller than the control switch threshold value Pth2, is compared to the average input power Ps1.

In Operation 30, if the average input power Ps1 is determined to be equal to or smaller than the control switch threshold value Pth (1), the process goes to Operation 20, and the APC of the excitation light source 11 is maintained. In a case where Ps1≦Pth (1), if the control switch threshold value Pth is assumed to be set to a low level corresponding to the conventional input break detection threshold value in the first setting example illustrated in FIG. 6, the density of the optical signal of the input light Ls is low. The average input power Ps1 monitored by the input monitor circuit 15 is obtained by time-averaging the total power of the input light of which the density of the optical signal is low for the monitor period that is longer than the transient response time of the EDF 11. Thus, the value becomes extremely small. Even if the value of the average input power Ps1 is small, the optical signals with various wavelengths that are intermittently input are in the normal state, and no input break is generated. Thus, the input light is desired to be amplified by a prescribed optical gain as an operation by the optical amplifier 1. The optical amplification in a case where Ps1≦Pth (1) is performed in the non-saturation region as described in FIG. 6. Accordingly, no wavelength tilt is generated if the control mode of the excitation light source 11 is set to the APC. The optical surge generated due to the transient response of the EDF 11 is suppressed by the non-saturation region that is large. The above-described property of the optical amplification is common in a case where the control switch threshold value Pth is set in the vicinity of the border between the non-saturation region and the saturation region as in the second to fourth setting examples illustrated in FIGS. 7 to 9.

To suppress the optical surge by the above-described conventional electrical method, the excitation light power is desired to be controlled faster than the transient response time (2 μs to 10 μs) of the EDF. To achieve the above-described control of the excitation light power, a change of the input power is desired to be detected in the monitor period that is shorter than 2 μs. When the power of the optical signal intermittently input is monitored according to this high-speed monitor period, the period without the optical signal is assumed to be longer than the monitor period, so that the optical amplification may be stopped based on a wrong judgment indicating that an input break is generated in this period. In the optical amplifier 1 according to the present embodiment, the transient response is controlled by applying the EDF 11 of which the non-saturation region is expanded, the change of the input power is not desired to be detected in the above-described high-speed monitor period, so that the monitor period of 10 μs or higher is applicable. This makes it possible to correctly judge the state of the optical signals with various wavelengths that are intermittently input, so that the switching of the control mode may be surely performed.

On the other hand, in Operation 30, if the average input power Ps1 is determined to be larger than the control switch threshold value Pth (1), the process goes to Operation 40. The setting of the control mode is switched to the AGC from the APC. In a case where Ps1>Pth (1), regarding any control switch threshold value Pth (1) in the first to fourth setting examples, the optical amplification may be performed in the saturation region, and the wavelength tilt may be generated. Accordingly, the wavelength tilt is prevented from being generated where the control mode of the excitation light source 12 is the AGC.

In Operation 50, the excitation light source control circuit 18 calculates an optical gain in the EDF 11 by using the average input power Ps1 from the input monitor circuit 15 and the average output power Ps2 from the output monitor circuit 17 and controls the driving state of the excitation light source 11 so that the optical gain is constant at a target value.

In Operation 60, the excitation light source control circuit 18 determines whether or not the average input power Ps1, which is monitored by the input monitor circuit 15, is larger than the control switch threshold value Pth stored in the memory circuit 19. As illustrated in the third setting example in FIG. 8, if the control switch threshold values Pth1 and Pth2 with the hysteresis are set, value comparison between the control switch threshold value Pth1, which is larger than the Pth2, and the average input power Ps1 is performed.

In the above-described Operation 60, if the average input power Ps1 is determined to be larger than the control switch threshold value Pth (2), the process goes back to Operation 50, and the AGC of the excitation light source 11 is maintained. On the other hand, if the average input power Ps1 is determined to be equal to or smaller than the control switch threshold value Pth (2), the process goes back to Operation 10. After the control mode is set to the APC from the AGC, the operations following Operation 20 are repeated.

As described above, the optical amplifier 1 according to the present embodiment monitors the average input power Ps1 according to the monitor period that is longer than the transient response time of the EDF 11 and switches the control mode to and from the APC or the AGC according to the value relation between the average input power value Ps1 and the control switch threshold value Pth. Due to this, the optical signals with various wavelengths that are intermittently input may be collectively amplified while the generation of the optical surge generated due to the transient response is suppressed, and an output light Ls', which does not have a wavelength tilt of which the signal level of each wavelength is constant, may be obtained. To set the control switch threshold value Pth in the vicinity of the border between the non-saturation region and the saturation region, more stable optical amplification operations are achieved if the control switch threshold value has the hysteresis.

In the above-described optical amplifier, the input monitor monitors the time average value of the total power of the optical signals with various wavelengths that are input into an amplification medium according to the monitor period that is longer than the transient response time of the amplification medium. According to the value relation between the monitor value and the control switch threshold value, the control mode of the excitation light source is switched to the APC or the AGC. As a result, the optical signals with various wavelengths that are intermittently input may be collectively amplified while the generation of the optical surge generated due to the transient response is suppressed, so that the output light, which does not have the wavelength of which the signal level of each wavelength is constant, may be obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the invention have been described in detail, it should be understood that the various changes, substitutions, and alterations could be made hereto without departing from the spirit and scope of the invention.

What is claimed is:

1. An optical amplifier comprising:
    an input port to which a plurality of optical signals with various wavelengths are input;
    an output port from which a plurality of optical signals with various wavelengths are output;
    an amplification medium which is allocated on an optical path between the input port and the output port and with which an rare-earth element for optical amplification is doped;
    a light source which supplies the amplification medium with an excitation light;
    a first monitor which monitors a total power of an optical signal of each wavelength to input into the amplification medium according to a monitor period which is longer than a transient response time of the amplification medium; and
    a controller which controls the light source so that a power of the excitation light is constant when a monitor value of the first monitor is equal to or smaller than a predetermined threshold value and which controls the light source so that an optical gain in the amplification medium is constant when the monitor value is larger than the predetermined threshold value.

2. The optical amplifier according to claim 1, wherein the predetermined threshold value is set in a non-saturation region of an amplification property corresponding to a target value of an optical gain in the amplification medium.

3. The optical amplifier according to claim 2, wherein the predetermined threshold value is set in a vicinity of a border between the non-saturation region and the saturation region of the amplification property.

4. The optical amplifier according to claim 1, wherein the predetermined threshold value is set in a vicinity of a border between a non-saturation region and a saturation region of the amplification property corresponding to a lowest target value in a setting range of the target value of the optical gain in the amplification medium.

5. The optical amplifier according to claim 3, wherein the predetermined threshold value has a hysteresis.

6. The optical amplifier according to claim 1, wherein the amplifier medium is formed by doping an optical fiber with a rare earth element as the rare-earth element.

7. The optical amplifier according to claim 6, wherein the amplifier medium is an erbium-doped fiber, and
    wherein the first monitor has a monitor period that is longer than 10 µs.

8. The optical amplifier according to claim 6, wherein the amplifier medium has a configuration in which a diameter of an active region is expanded.

9. The optical amplifier according to claim 1, wherein the plurality of optical signals include an optical burst signal.

10. The optical amplifier according to claim 1, wherein the plurality of optical signals includes an optical packet signal.

11. The optical amplifier according to claim 1, further comprising:
    a second monitor which monitors an excitation light supplied to the amplifier medium; and
    a third monitor which monitors a total power of an optical signal of each wavelength output from the amplification medium, wherein
    when a monitor value of the first monitor is equal to or smaller than the predetermined threshold value, the controller controls the light source by using the monitor value of the second monitor, and when the monitor value of the first monitor is larger than the predetermined threshold value, the controller controls the light source by using each monitor value of the first monitor and the third monitor.

* * * * *